United States Patent [19]

Britt et al.

[11] Patent Number: 4,999,983
[45] Date of Patent: Mar. 19, 1991

[54] CORN HARVESTER

[75] Inventors: Donald B. Britt; Steven S. Dow, both of Byron, N.Y.

[73] Assignee: Byron Enterprises, Inc., Byron, N.Y.

[21] Appl. No.: 467,617

[22] Filed: Jan. 19, 1990

[51] Int. Cl.$^5$ ............................................. A01D 45/02
[52] U.S. Cl. ........................................... 56/107; 56/62
[58] Field of Search .................... 56/107, 62, 71, 103, 56/104; 460/26, 38

[56] References Cited

U.S. PATENT DOCUMENTS

| 982,798 | 1/1911 | Corderman . | |
|---|---|---|---|
| 1,042,371 | 10/1912 | Baird . | |
| 2,651,163 | 9/1953 | Aasland | 56/107 |
| 3,075,339 | 1/1963 | Barkstrom | 56/98 |
| 3,361,136 | 1/1968 | Turnbull | 460/26 |
| 3,499,272 | 3/1970 | Looker | 56/18 |
| 3,535,857 | 10/1970 | Looker | 56/18 |
| 3,648,443 | 3/1972 | Sears | 56/111 |
| 3,705,482 | 12/1972 | Purrer | 56/13.9 |
| 3,932,984 | 1/1976 | Brassette | 56/63 |
| 4,581,878 | 4/1986 | Wida | 56/114 |

FOREIGN PATENT DOCUMENTS

161987  4/1964  U.S.S.R. .

Primary Examiner—Ramon S. Britts
Assistant Examiner—Terry Lee Melius
Attorney, Agent, or Firm—Martin Lukacher

[57] ABSTRACT

A harvester especially adapted for removing ears of sweet corn from stalks which are severed and enter the harvester, rather than being ejected by the snapping rolls of a primary ear stripping mechanism of the harvester, uses stalk engaging belts which bring the severed stalks into stalk ejecting rolls. Ahead of the rolls are stripping rods which engage the ears at their shanks and peel the ears off the stalks as the stalks are pulled outwardly out of the harvester by the ejecting rolls.

24 Claims, 6 Drawing Sheets

CORN HARVESTER

DESCRIPTION

The present invention relates to harvesters for crops, such as corn, and particularly to harvesters having a secondary ear stripping mechanism and stalk ejector for stalks which are severed and enter the harvester with part of the crop still attached thereto.

The present invention is especially suitable for use on mobile sweet corn harvesting machines which have a primary ear stripping mechanism. The invention provides a secondary ear stripping mechanism for removing ears of corn from stalks which have been severed during primary ear stripping operations. Then the upper part of the stalk, which may have ears still attached, enters the harvester. It is the principal feature of this invention to provide a secondary crop (e.g. corn ear) stripping and stalk ejection mechanism which harvests the crop remaining on the stalk remnant which enters the machine and prevents the stalk remnant and other growth thereon from jamming the harvester.

Conventional corn harvesting machines have gathering belts or chains which move with the machine along the corn row or rows and gather the stalks with the crop from both sides of each row. The stalks with ears attached are advanced through horizontal or sloping stripper plates. Sharpened knife or snapping rolls are located beneath the plates and pull the corn stalk downward through the slot between the plates. The ear is stopped by the plates and the ear is stripped from the stalk. The stalk is supposed to be ejected downwardly onto the ground; however, from time to time a stalk is severed just below the ear, then the remainder of the stalk up to the top thereof (the stalk remnant) will continue to be moved along the top of the stripper plate by the action of the gathering belts or chains. The problem of removal of the ears still attached to the corn stalk, and the prevention of the severed stalks from being mixed in with the harvested ears and even worse, from clogging the rest of the harvesting machine, remains to be solved.

The principal object of the invention is to provide a practical and reliable secondary ear stripping and stalk ejector mechanism for handling the stalk remnants and removing any remaining ears therefrom.

It is another object of the invention to provide improved crop harvesting means by which delicate crops, such as sweet corn, may be gently peeled from the stalks on which they are grown.

It is a further object of the present invention to provide an improved mobile corn harvesting machine capable of handling severed stalks which enter the machine for the removal of any ears thereon and for the ejection of the stalks in a manner whereby jamming of the mechanism by the stalks and other vegetation thereon is minimized.

Briefly described, the present invention is adapted for use on a harvester for crops which grow on stalks (such as ears of corn). The crops have a shank at one end thereof, which is attached to the stalk. The mechanism removes the crop through the use of ejector means for engaging the stalks and pulling them in a direction outwardly of the harvester. Means are provided for transporting the stalks to the ejector means (preferably guide belts which yieldably engage the stalks and transfer them to the ejectors). Means are provided for removing the crop while the stalks are transferred from the belts to the ejector means. Such stripping means preferably includes rods which are spaced laterally from each other so as to allow the stalks to enter the ejector means. The rods are preferably tilted downwardly and toward the ejector means so as to engage the crop (the ears) at their shanks and rotate the ears so as to enable them to be peeled away from the stalks as the stalks are pulled outwardly by the ejector means.

The foregoing and other objects, features and advantages of the invention as well as a presently preferred embodiment thereof and the mode of operation of that embodiment will become more apparent from a reading of the following description in connection with the accompanying drawings in which.

Figure 1:
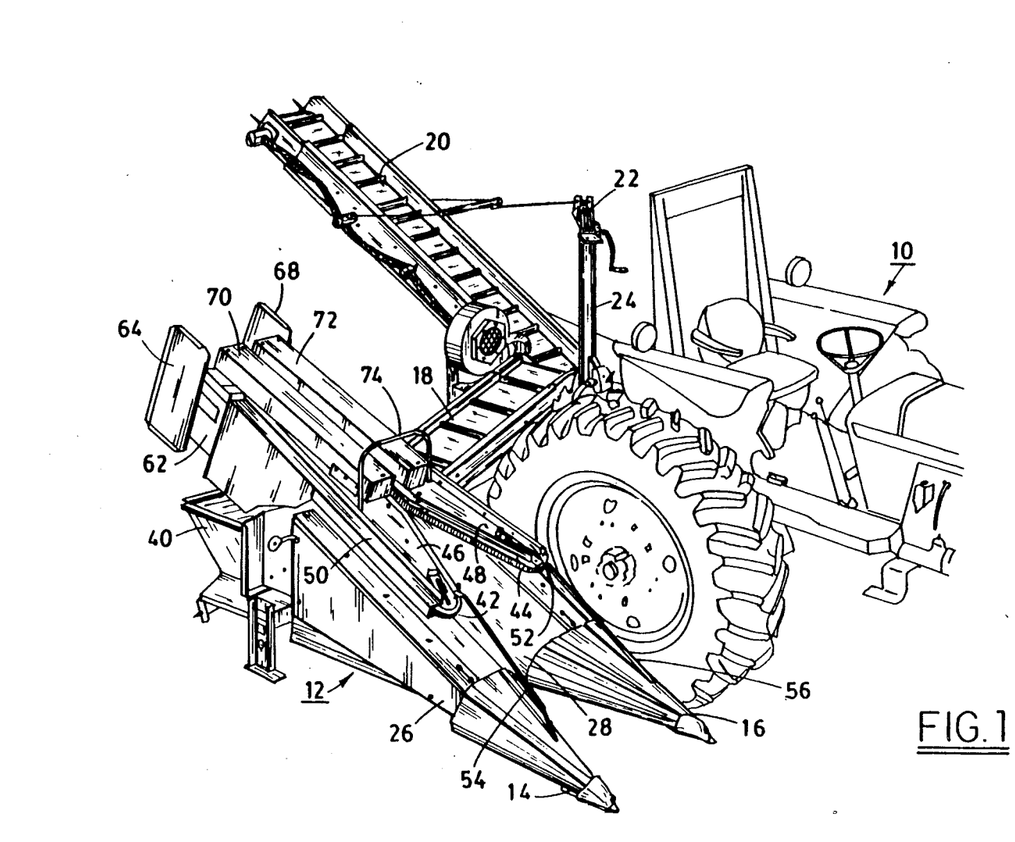
FIG. 1 is a pictorial view showing a mobile corn harvester embodying the invention attached to a tractor.

Referring more particularly to FIG. 1, there is shown a tractor 10 to which a harvester 12 embodying the invention is hitched. A single row harvester has two gathering points 14 and 16 which travel along opposite sides of the row of corn being harvested. The invention may, of course, be used in multi-row harvesters. Also hitched to the tractor 10 and transported with the harvester is a cross conveyor 18 and an elevator conveyor 20. These conveyors 18 and 20 carry the harvested ear of corn to a truck or cart which travels behind or along side the tractor. The elevator 20 can swing outward parallel to the conveyor 18 for delivery of the harvested ears to a truck or cart along side the tractor. The height of the elevator conveyor 20 is adjustable by a hoist 22 which is connected to the top of a post 24 extending upwardly from the rear of the tractor 10.

The gathering points are connected to housings 26 and 28 in which cleated gathering belts 30 and 32 (FIG. 2) are located. These gathering belts carry the stalks through a gap between the stripper plates, one of which 34 is partially shown in FIG. 2. Snapping or knife rolls 36 and 38 are located below the gap in the stripper plates. The knife rolls 36 and 38 pull the corn stalk downward through the gap between the stripper plates until an ear is stopped by the plates. The ear is then cut from the stalk and propelled towards the rear of the harvester by the cleated belts 30 and 32 where they fall into a hopper area 40 at the rear of the cross conveyor 18. For further information as to the design of the gathering belts, the stripper plates and snapping rolls of knifes which provide the primary ear stripping mechanism of the harvester 12, reference may be made to U.S. Pat. No. 4,845,930 issused to Paul W. Dow on Jul. 11, 1989.

Figure 2:
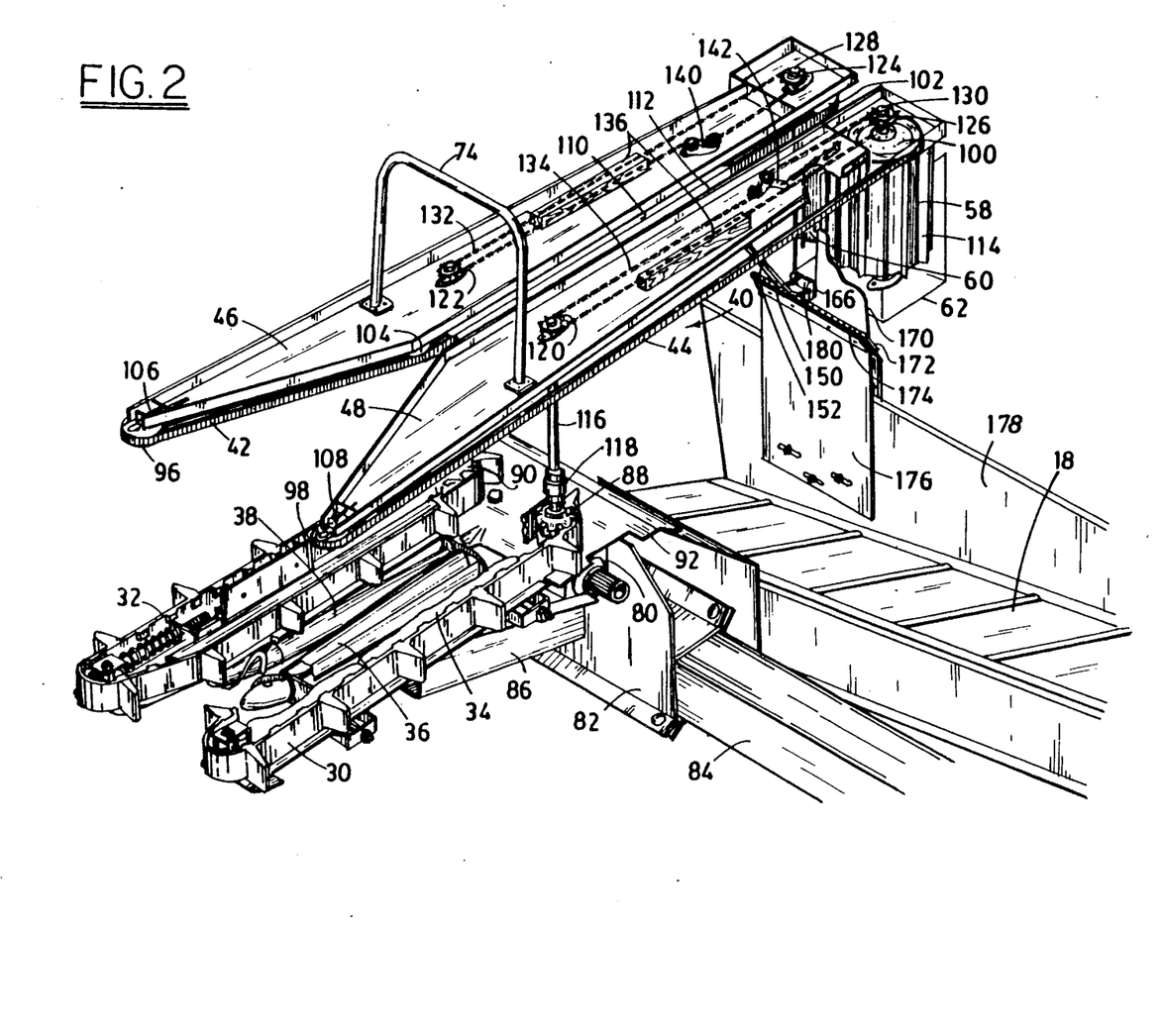
FIG. 2 is a simplified perspective view showing the principal operating parts of the mechanism of the harvester shown in FIG. 1.

Upper belts 42 and 44 are mounted on frames 46 and 48 located on the housings 26 and 28. These belts 42 and 44 are in a plane parallel to the plane of the belts 30 and 32, which may be horizontal or tilted upwardly toward the rear of the machine. The belts 42 and 44 are covered by guards 50 and 52. Stalk guide rods 54 and 56 guide the stalks into diverging reaches of the belts. The stalks that are so guided and reach the belts are usually the stalk remnants which are severed during the initial stripping of the ears by the stripper plates and snapping rolls 36 and 38.

Figure 4:
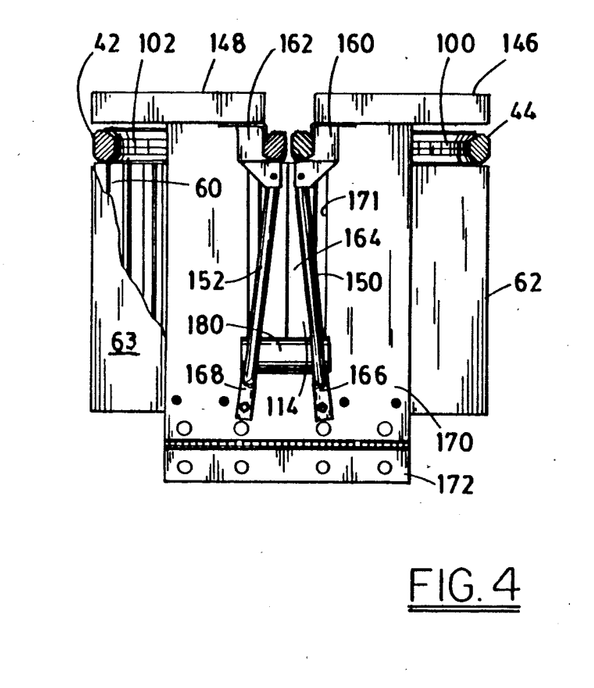
FIG. 4 is a front view of the portion of the mechanism shown in FIG. 3.

The belts 42 and 44 may also be referred to as stalk ejector belts since they lead to bladed stalk ejector rolls (drums) 58 and 60 (FIG. 2) enclosed in housings 62 and 63 (see FIG. 4). Side flaps 64 and 68 attached to the housing 62 and 63 control the flow of the ejected stalks and other debris from the ejector rolls outward from the rear of the harvester 12. The frames 46 and 48 support guards 70 and 72 for chains (132 and 134-FIG. 2) which drive the belts 42 and 44. The frames 46 & 48 are also connected by a spreader tube 74 which enables them to be lifted when detached from the housings in the event that it is necessary to have access to the region where the stalks and the stripped ears are transported whenever it is necessary or desirable to inspect clear or otherwise maintain the harvester 12.

Figure 3:
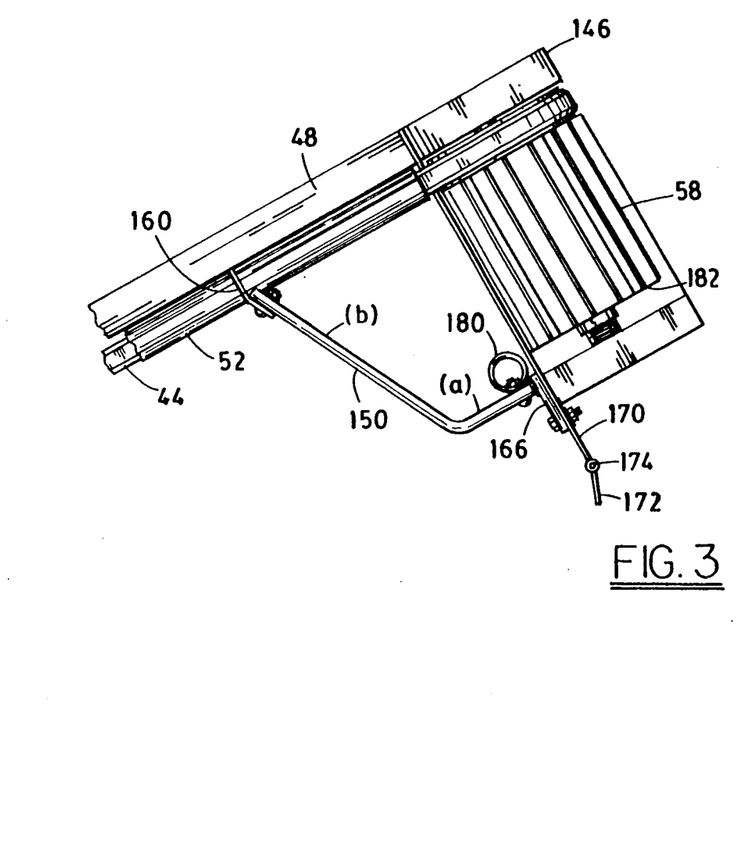
FIG. 3 is a framgentary side view showing the secondary corn ear stripping mechanism of FIG. 2.

Referring more particularly to FIGS. 2, 3 and 4, there is shown a gear box 80 mounted on a bracket assembly 82. The gear box is driven by tractor P.T.O. (power take off) shaft or shafts directly or via another gear box or shaft. A beam 84 which extends laterally from the tractor (10 FIG. 1) supports the bracket 82 and also the cross conveyor 18. A structural support member 86 is attached to the bracket 82 and mounts the primary stripping mechanism which includes the gathering belts 30 and 32, the; stripper plate 34 and the bladed rolls 36 and 38. These rolls 36 & 38 are driven from two output shafts on the gear box 80. Other output shafts turn sprockets 88 and 90 which drive the gathering belts 30 and 32. These sprockets are above a plate 92 over which the ears which are stripped by the primary mechanism move into the hopper area 40.

Figure 5A:
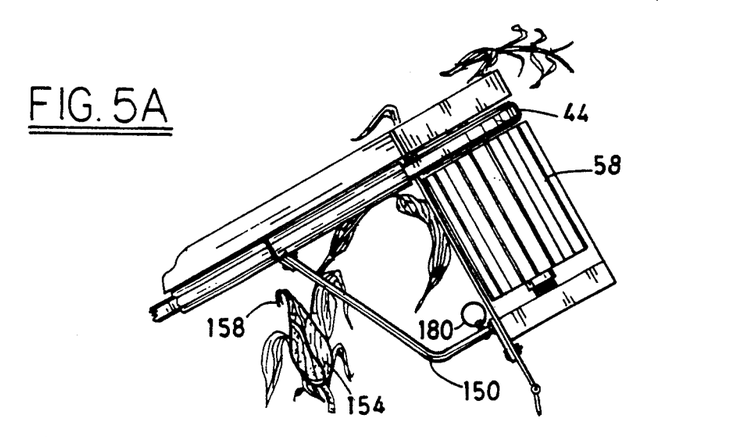
FIGS. 5A, B and C show the ear stripping action of the mechanism shown in the previous figures where the ears arrive at the stripper rods in an upright position on the stalks.

The stalk transporting and ejector belts 42 and 44 are mounted on forward pulleys 96 and 98 and rear pulleys 100 and 102. These pulleys are disposed on top of and are coaxial with the drums 58 and 60. Idler pulleys, one of which 104 is shown in FIG. 2, define the paths of the belts. The forward pulleys 96 and 98 are disposed on tensioning mechanisms 106 and 108 so as to maintain tension in the belts. The belts run along a straight reach 110 and project laterally from belt guides 112 which are connected to the frames 46 and 48. Only one of the belt guides 112, which is connected to the frame 46, is shown. The belts 42 and 48 in the straight reaches 110 thereof run in contact with each other and engage the corn stalks there between at the top thereof as shown in FIG. 5A. Since the rear pulleys 100 and 102 are coaxial with the drums, the stalks are positively driven into the drums. These drums have paddle blades 114 which are offset so they are interdigited in the gap between the drums 58 and 60. Because of the blades 114 the drums aggressively grip the stalks thereby providing a strong pull necessary for the stripping of the ears from the stalks. The use of the belts 42 and 44 alone would allow the stalks to slip as the ears are stopped upon secondary ear stripping operations and the harvester would quickly jam.

The transporting and ejecting belts 42 and 44 are driven by shafts (one of which 116 is shown in FIG. 2). These shafts are connected through couplings 118 to the shafts from the gear box 80 which also drives the gathering belt drive sprockets 88 and 90. Front sprockets 120 and 122 are connected to the shafts 116. Rear sprockets 124 and 126 are connected on to shafts 128 and 130 to which the drums 58 and 60 and the pulleys 100 and 102 are keyed. Drive chains 132 and 134 extend around sprockets 122 and 124 and 120 and 126, respectively. The chains 132 and 134 are guided by guide blocks 136, and are tensioned by bell crank spring biased tensioning mechanisms 140 and 142. The front and rear sprockets and chains are covered by the guards 70 and 72 (FIG. 1). Guard portions 146 and 148 are part of (welded to) housings 62 and 63. The sprockets 124 and 126 are located within the guard portions 146 and 148. They are not shown in FIGS. 3-7.

Figure 5B:
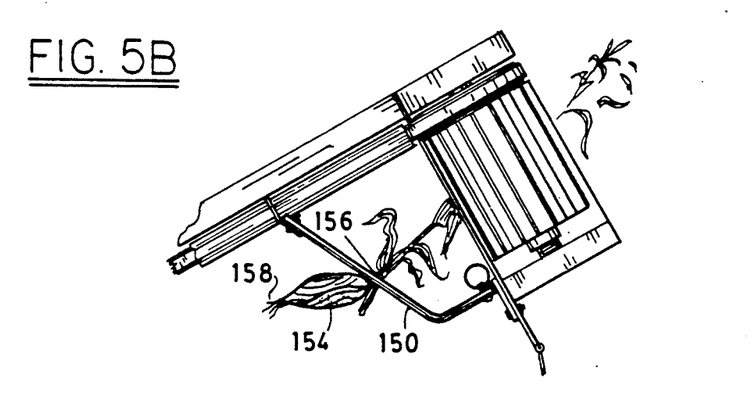
Figure 5C:
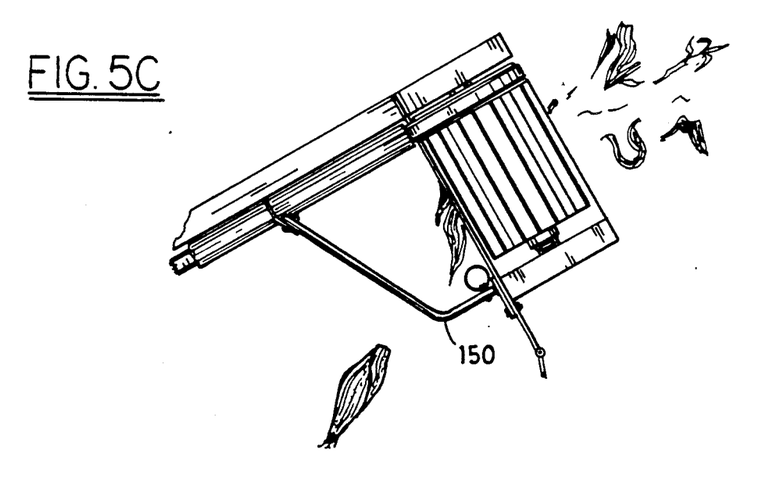
Figure 6A:
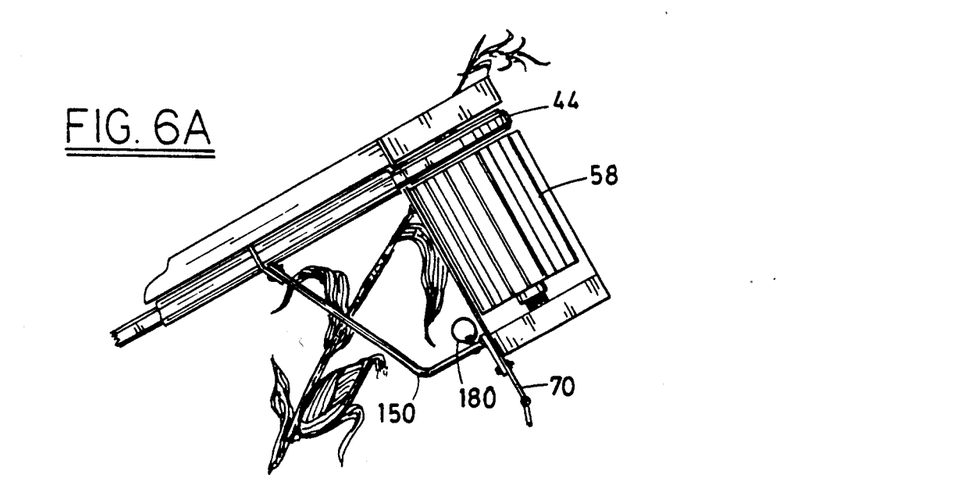
FIGS. 6A, B and C are views similar to FIGS. 5A, B and C showing the action of the mechanism where the ears arrive in a downward or forwardly facing position on the stalks and are rotated by the stripping rods to a position where the ears are gently peeled from the stalks.
Figure 6B:
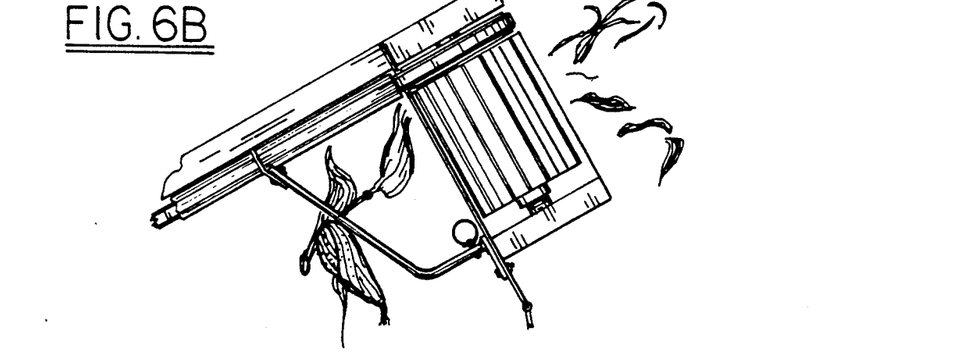
Figure 6C:
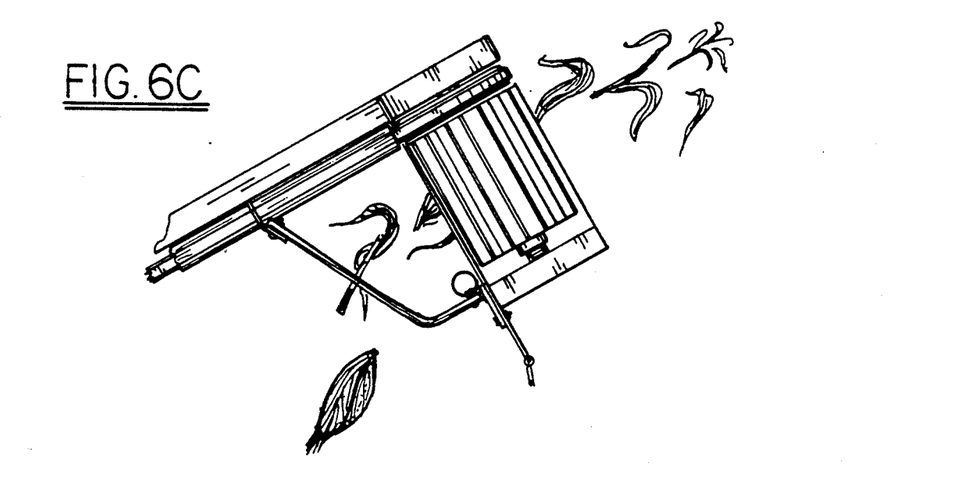
Figure 7A:
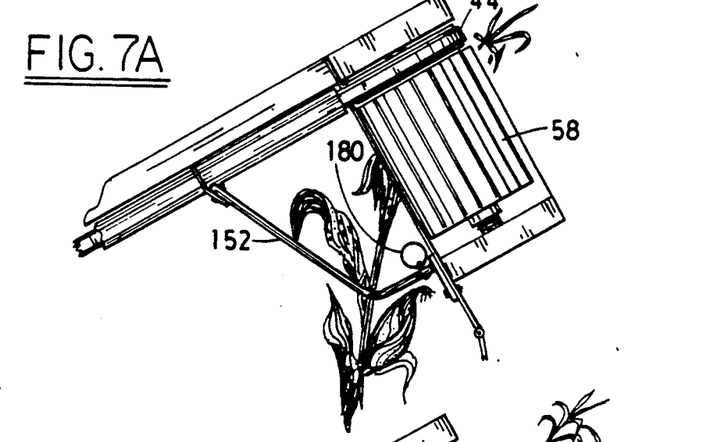
FIG. 7A, B and C are views similar to FIGS. 5 and 6A, B and C showing the ear stripping action where the ears arrive at the ear stripping mechanism below the ear stripping rods.
Figure 7B:
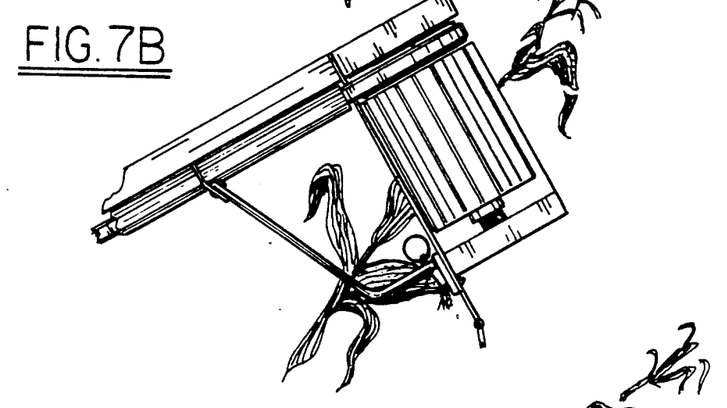
Figure 7C:
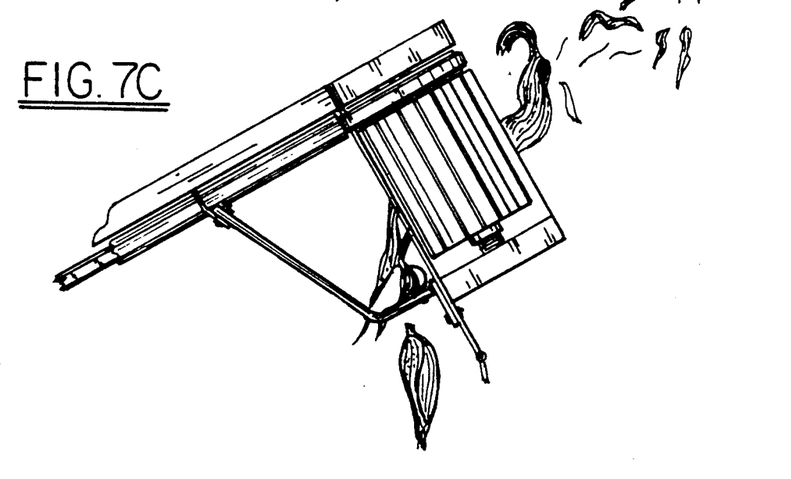

The sprocket diameters are selected so that the belts 42 and 44 are driven at linear speeds greater than the gathering belts 30 and 32. This difference in speed forces the stalk to lean in the direction of travel as shown in FIGS. 5, 6 and 7. This angling of the stalks in conjunction with the coaxial mounting of the belt pulleys 100 and 102 and the ejection rolls or drum 58 and 60 results in a smooth transfer of the stalks from the belts to the rolls.

The secondary ear stripping operations occurs at stripper bars or rods 150 and 152. These rods (preferrably circular in cross-section) are mounted below the belt guides 112 just in front of the ejector rolls 58 and 60. The diameter of these rods is less than the typical diameter of the ears of corn. Typical ears are shown in FIGS. 5, 6 and 7. As shown in FIG. 5A and B, a typical ear 154 has a shank 156 and a tip 158; the shank and tip being at opposite ends of the ear 154.

The proximity of the stripping rods 150 and 152 to the ejector rolls 58 and 60 is such that the stalks are engaged by the blades of the rolls while the stalks are still passing the rods 150 and 152. In other words, the majority of the rods 150 and 152 are at a distance along the path of travel of the stalks from the rolls which is generally less than the length of the stalks. The rods 150 and 152 are each bent at an obtuse angle so as to define two portions (a) and (b). The portion (b) is mounted so that it is parallel to the path of travel. In other words, the portions (a) are perpendicular to the axes of rotation of the rolls (i.e. the axes of the shafts 128 and 130). The angle which the titled portion (b) makes with the plane in which the ejector belts 42 and 44 lie is suitably about 45°.

As best seen in FIG. 4 the rods 150 and 152 are spaced apart laterally and separated by a gap 164 through which the stalks pass. This gap tapers so that it is wider at the bottom of the stripper rods than at the top thereof. This increasing gap functions to prevent plugging or jamming of the harvester. For example, if an ear or other debris becomes jammed between the rods 150 and 152, the stalks and ears following tend to push them down and back along the rods. As the gap 164 gets wider the ears become free and are then pushed out at the bend between the portions (a) and (b).

The rods 150 and 152 are bolted to attachment tabs 160 and 162 connected to the frames 46 and 48. The opposite ends of the rods 150 and 150 are attached to brackets 166 and 168 which are bolted to a panel 170. The panel may have slots which enable the rods 150 and 152 to pivot about their attachment tabs 160 and 162 so as to set the taper of the gap 164.

A panel 170 is attached to the rear ends of the frames 46 and 48. The bottom end of the panel 170 has a flap 172 attached by a hinge 174. The flap 172 is bolted to a clamping bracket 176 (FIG. 2) The bracket 176 connects the panel and the ejector rod assembly to a side wall 178 of the cross conveyor 18 in the hopper area 40.

The panel 170 has a slot 171 in alignment with the gap between the ejector rolls 58 and 56 (through which the interdigited blades travel). The gap 164 is also in alignment with this gap and with the slot 171.

A cross tube 180 is attached to the top side of the rods 150 and 152 at a point tangent to both rods and adjacent to the panel 170. This cross tube is a steel tube, but may be made out of resilient material such as rubber. The cross tube is located at the lower end 182 of the ejector rolls 58 and 60. The cross tube extends slightly above the bottom 182 of these rolls. The function of the cross tube 180 is to keep the stalks from getting below the rolls 58 and 60 and to provide a smooth large radius surface that prevents the stalks from kinking and breaking off before they reach the rolls 58 and 60. A flap of rubber or other resilient material (not shown) may be attached to the same bolts as attached to brackets 166 and 168. This flap provides a cushion to reduce the possibility of kernel damage as the ears drop into the hopper 40.

The operation of the harvester and particularly the stripping action at the rods 150 and 152 will be more apparent from FIGS. 5, 6 and 7. Typically the tip of the ear which is still attached to the stalk, because the stalk is angled due to the difference in linear speed of the gathering belts and the ejector belts, is tilted as shown in FIG. 5A. The tip 158 of the ear is then outside of the rods 150 and 152, either to the left or to the right. Therefore, one of the rods is disposed between the stalk and the ear at the shank of the stalk. The shank is stopped at the rods and peeling action occurs at the shank as the stalk is pulled through the rods. The ear is stripped and falls into the hopper 40 at the end of the cross conveyor 18.

The worst case conditions are shown in FIGS. 5, 6 and 7. In FIG. 5, the tip 158 of the ear 154 is between the rods and trailing behind the stalk. Because of the tilt of the rods and the angle of the stalk to the direction of travel thereof, the ear first contacts at least one of the rods at a point near its tip. This causes the ear to rotate away from the stalk and to cause the stalk to peel off at the shank of the ear as the stalk is pulled through the ejector rolls 58 and 60.

As shown in FIGS. 6A, B and C, the ear is betwen the rods 150 and 152, but in front of the stalk. The ears to be stripped in this case are close to the top (the tassel end) of the stalk. In such case where the ear is high on the stalk, the tip contacts the rods on their upper angled portion (a). Because of the angular relationship of the stalk to the rods, the rods cause the ear to rotate forwardly and downwardly along the rods thereby causing the stalk to be pulled over the top of the ear and be peeled off.

In the case shown in FIGS. 7A, 7B and 7C, the tip of the ear is also between the bars and in front of the stalk. However, the ear is low on the stalk. The tip then does not contact the rods until it reaches the cross tube 180. Then, the tip of the ear is stopped by the cross tube and the ear rotates around the point of contact at the cross tube allowing the stalk to be pulled off over the top of the ear.

In the foregoing description, it will be apparent that there has been provided an improved machine for harvesting crops such as corn. The invention is illustrated, embodied in a corn harvester having a secondary ear stripping mechanism for stalks which are severed and enter the harvester instead of being driven towards the ground by the initial bladed rolls 36 and 38. It will be appreciated that other applications for the invention as well as variations and modifications thereof within the scope of the invention will suggest themselves to those skilled in the art. Accordingly, the foregoing description should be taken as illustrative and not in a limiting sense.

We claim:

1. In a harvester for crops which are grown on stalks said crops having a shank at one end thereof which is attached to the stalk, a mechanism for removing unstripped crops from stalks, said mechanism comprising stalk ejector means for engaging the stalks and pulling them in the direction outwardly of the harvester, means for transporting the stalks to said ejector means, and stripping means spaced from said ejector means ahead of said ejector means a distance not exceeding the length of said stalks for engaging said unstripped crops at the shanks thereof and causing said crops to be peeled from said stalks while said ejector means is pulling said stalks outwardly from said harvester.

2. The mechanism according to claim 1 wherein said harvester has primary crop stripping means for gathering said stalks, driving said stalks into said harvester and stripping said crop, said mechanism providing secondary stripping means and being disposed behind said primary stripping means in the direction in which said stalks are driven through said harvester.

3. The mechanism according to claim 2 wherein said primary stripping means includes gathering belts between which said stalks are driven into said harvester, and said transporting means comprising guide belts vertically spaced above said gathering belts for engaging said stalks in the vicinity of the upper ends thereof, and means for driving said guide belts at a higher linear speed than said gathering belts for tilting said stalks toward said ejector means.

4. The mechanism according to claim 3 wherein said ejector means comprises counter-rotatable rolls having means for engaging said stalks there between, and pulleys coaxial with said rolls around which said guide belts extend whereby said stalks are engaged with said guide belts when they reach said rolls.

5. The mechanism according to claim 4 wherein said rolls have blades extending therefrom across a gap between said rolls into which said stalks move as they are driven by said guide belts.

6. The mechanism according to claim 4 wherein said rolls have axes of rotation parallel to each other, said rolls being spaced from each other in a lateral direction a sufficient distance to grip the stalks there between, said stripping means comprising a pair of rods spaced from each other in the lateral direction a sufficient distance to define a gap through which said stalks pass into said ejection rolls, and said rods being tilted with respect to the axes of said rolls.

7. The mechanism according to claim 6 wherein said rolls have upper and lower ends, said pulleys and said belts being disposed at said upper ends of said rolls, said rods having upper and lower ends and being closer to said rolls at the lower ends thereof than at the upper ends thereof.

8. The mechanism according to claim 7 wherein said rods have portions at the lower ends thereof extending generally perpendicular to the axes of said rolls.

9. The mechanism according to claim 8 wherein said gap between said rods tapers outwardly from the upper to the lower ends thereof.

10. The mechanism according to claim 9 further comprising a cyclindrical member extending across said gap between said rods, said member being disposed at the lower ends of said rods.

11. The mechanism according to claim 10 wherein said cylindrical member is disposed at and extending above the lower ends of said rolls.

12. The mechanism according to claim 11 wherein said member has a greater diameter than said rods.

13. The mechanism according to claim 12 wherein said member is a tube of resilient material.

14. The mechanism according to claim 9 further comprising a panel disposed ajdacent to and ahead of said rolls in the direction of travel of said stalks toward said rolls, said panel extending in a direction along the axes of said rolls and being parallel thereto, said panel having a slot in alignment with said gap between said rods through which said stalks pass into said rolls, said rods being connected to said panel at the lower ends thereof.

15. The mechanism according to claim 1 wherein said ejector means comprises counter-rotatable rolls having means for engaging said stalks there between, said transport means being guide belts between which said stalks are engaged for driving said stalks along a linear path to said rolls, pulleys coaxial with said rolls around which said guide belt extends whereby said stalks are engaged by said guide belts when they reach said rolls.

16. The mechanism according to claim 15 wherein said rolls have blades extending therefrom across a gap there between into which said stalks move.

17. The mechanism according to claim 16 wherein said rolls have axes of rotation parallel to each other, said rolls being spaced laterally from each other a sufficient distance to grip the stalks there between, said stripping means comprising a pair of rods spaced laterally from each other a sufficient distance to define a gap through which said stalks pass into said ejection rolls, and said rods being tilted with respect to the axes of said rolls.

18. The mechanism according to claim 17 wherein said rolls have upper and lower ends, said pulleys and said belts being disposed at said upper ends of said rolls, said rods having upper and lower ends and being closer to said rolls at the lower ends thereof than at the upper ends thereof.

19. The mechanism according to claim 18 wherein said gap between said rods tapers outwardly from the upper to the lower ends thereof.

20. The mechanism according to claim 19 further comprising a cylindrical member extending across said gap between said rods, said member being disposed at the lower ends of said rods.

21. The mechanism according to claim 20 wherein said cylindrical member is disposed at and extending above the lower ends of said rolls.

22. The mechanism according to claim 21 wherein said member has a greater diameter than said rods.

23. The mechanism according to claim 22 wherein said member is a tube of resilient material.

24. The mechanism according to claim 20 further comprising a panel disposed adjacent to and ahead of said rolls in the direction of travel of said stalks toward said rolls, said panel extending in a direction along the axes of said rolls and being parallel thereto, said panel having a slot in alignment with said gap between said rods through which said stalks pass into said rolls, said rods being connected to said panel at the lower ends thereof.

* * * * *